UNITED STATES PATENT OFFICE.

RICHARD G. BRINDLE AND AMOS H. FLINT, OF CHICAGO, ILLINOIS, ASSIGNORS TO CORN PRODUCTS REFINING COMPANY, A CORPORATION OF NEW JERSEY.

PRODUCT USABLE AS FERTILIZER AND METHOD OF MANUFACTURING THE SAME.

1,313,162.     Specification of Letters Patent.     Patented Aug. 12, 1919.

No Drawing.     Application filed July 3, 1918. Serial No. 243,247.

*To all whom it may concern:*

Be it known that we, RICHARD G. BRINDLE and AMOS H. FLINT, citizens of the United States, residing at Chicago, in the county of Cook and State of Illinois, have invented certain new and useful Improvements in Products Usable as Fertilizer and Methods of Manufacturing the Same, of which the following is a specification.

Our invention relates to the manufacture of a product from corn usable as a fertilizer or as an ingredient of a fertilizer or other purposes; and the primary object of the invention is to utilize certain soluble substances contained in corn, especially the substances dissolved from corn during the steeping operation in the manufacture of corn starch or derivative products, for the production of a dry material having certain useful properties as will be hereinafter set forth. In the manufacture of corn starch and products derived therefrom, it is customary, according to present day methods, to steep the corn in dilute sulfurous acid to soften the kernels and facilitate the removal of the germs and the separation between starch and the glutinous ingredient of the corn. This steeping operation dissolves from the corn considerable quantities of soluble substances contained therein and these substances have been used to enrich the cattle feed of which the bran or husk of the corn forms the principal constituent. It has not been deemed feasible to evaporate the steep liquor to dryness, nor is it possible to do so by the use of ordinary evaporators because after being dried to viscosity it will char and burn; and so far as we are aware, no dry product usable as a fertilizer has ever been manufactured from steep water alone although the liquor derived from the steeping of corn contains substances, particularly potash, which are of particular value for fertilizing purposes.

Our novel product is preferably made as follows: The corn is steeped in the usual way and the steep water after being drawn from the corn is concentrated in vacuum pans or by other methods to a density of approximately 30° Baumé. In order to give a product in powdered form the concentrated liquor may be sprayed into a current of heated air and evaporated to dryness by the common method of spray desiccation. However, in this form the product will soon absorb moisture and become extremely dense and hard. Moreover, its hygroscopicity makes it particularly subject to spontaneous combustion. We therefore prefer to evaporate the material in the following novel manner: The liquor is sprayed against a collecting surface through a current of hot air which is insufficient in temperature or volume to evaporate all of the water from the liquor but which concentrates the liquor sufficiently so that it will adhere and build up upon the collecting surface. This operation is continued for a time until a certain quantity of still moist substance has accumulated on the collecting surface. The ratio of liquor flow to the flow of the drying gas is changed so that the gas, the heated air, is capable of evaporating not only the substance being sprayed but also the moist substance accumulated on the collecting surface. This condition may be most conveniently brought about by reducing the flow of the liquor. The dry substance which falls from the collecting surface will consist of lumps of different sizes, mixed with some dust, the lumps being porous and friable in character, and with reasonable precautions may be kept indefinitely without danger of caking or hardening.

This product contains properties which make it valuable as a fertilizer or as an ingredient of the fertilizer. An approximate analysis of a sample of the material shows that it contains the following ingredients in the proportions as follows:

| | |
|---|---|
| Protein matter | 38.80% |
| Phosphoric acid | 6.92% |
| Potash | 6.83% |
| Sugar and other substances | 47.45% |
| | 100.00% |

We do not claim herein the preferred method of drying, involving the alternate treatments of the materials as above described, except as a step in the method of making the fertilizing compound herein described, as this method of drying is capable of advantageous use in connection with other materials and is made the subject matter of our co-pending application Serial No. 243246 filed July 3, 1918.

In using the word "dry" in the specification and claims we do not mean to imply the complete elimination of moisture. The product will ordinarily contain some moisture. By "dry" we mean dry in the commercial sense.

We claim:

1. A product usable as a fertilizer or ingredient of a fertilizer composed of the soluble substances extracted from Indian corn substantially unchanged chemically and in a dry state.

2. A product usable as a fertilizer or ingredient of a fertilizer composed of the soluble substances extracted from Indian corn, dry and in the form, largely, of porous, friable lumps.

3. The method of manufacturing from Indian corn a product usable as a fertilizer or as the ingredient of a fertilizer, which consists in steeping the corn, concentrating the steep liquor by elimination of a portion of the water therefrom, and spraying the concentrated liquor into a current of drying gas against a collecting surface and at a rate exceeding the capacity of the gas to bring about evaporation to dryness, so that the substance will adhere to said collecting surface in a moist state, and thereafter continuing the spraying of the material, but at such a rate, proportioned to the volume and temperature of the gas, that the gas will cause the substance adhering to the collecting surface to become dry.

4. A product consisting of the solids, in a dry state, of the steep liquor derived from the steeping of Indian corn in the manufacture of corn starch.

RICHARD G. BRINDLE.
AMOS H. FLINT.